Sept. 22, 1953

B. F. GALLUPPI 2,653,040

PIPE COUPLING

Filed Dec. 15, 1949

INVENTOR
BERNARDINO F. GALLUPPI

BY his  ATTORNEYS.

Patented Sept. 22, 1953

2,653,040

UNITED STATES PATENT OFFICE 2,653,040

PIPE COUPLING

Bernardino F. Galluppi, New York, N. Y., assignor to Barker, Smith and Company, New York, N. Y., a corporation of Delaware Application December 15, 1949, Serial No. 133,167

4 Claims. (Cl. 285—90)

This invention relates to pipe coupling, and has particular reference to a coupling for joining pipes in such a way that the coupled pipes have angular flexibility at the coupling and the coupling has great resistance to tension forces without impairing its strength or tightness.

In accordance with usual pipe-line practice, the individual pipes are coupled in the field to form sections of considerable length, sometimes as much as a quarter of a mile in length, which is then dragged over the ground by a tractor to connect it to the previously fitted pipe-line. Inasmuch as couplings of great strength are required to withstand the considerable tension, the usual threaded types of coupling are employed which, however, afford no angular flexibility to the pipe so that the flexibility required of the pipe to enable it to conform to the contour of the terrain across which it is dragged and laid must be afforded by the pipe itself. However, the limit of flexibility of steel pipe is sometimes exceeded in cases where sharp declivities are encountered, and the pipe has been known to buckle and sometimes even to break. Concrete or cement pipe has even less flexibility than steel pipe, and so its use is virtually limited to straight or level runs not often encountered in long pipe-line practice.

It has been recognized that the solution of the problem is to provide the desired flexibility in the coupling itself, but no satisfactory flexible coupling has been provided which has the great strength required by the common practice of dragging long coupled pipe sections over the ground, during which the first coupling takes the greatest tension load with decreasing loads on the succeeding couplings, these loads being frequently increased upon contact of a protruding portion of the coupling with some obstacle in its course thereover.

In accordance with the present invention, a coupling for joining metallic and non-metallic pipes is provided which affords angular flexibility between the coupled pipe ends to enable a long coupled section thereof to conform to the terrain and at the same time the coupling has great strength in tension so that a load on the order of tons can be applied thereto without impairing its strength or causing it to leak in use.

In a preferred embodiment of the invention, the ends of the pipe to be coupled are provided with an annular groove in which is seated a ring gasket of non-metallic resilient sealing material such as rubber, this gasket projecting radially above the pipe and being engaged on one lateral side by one end of a sleeve spanning the ends of the adjacent pipes and engaging the gasket on the adjoining pipe with its other end, whereas the other lateral sides of the two gaskets are engaged by inclined shoulders on the inner surfaces of corresponding collars which are adapted to be drawn together by a threaded connection. When so drawn together the collars squeeze each rubber ring between the contacting end of the sleeve and the corresponding inclined shoulder on the collar so that the rubber is forced radially outwardly and inwardly to seal itself between the pipe and the corresponding collar. The flexibility of the rubber packing and the absence of a rigid connection between the adjoining pipe ends enables the coupled pipe to be bent at angles up to thirty degrees to the pipe axis.

It will be seen that the new pipe coupling of this invention is susceptible of efficient use for coupling pipes of metal, concrete or cement, initially plastic resins, and combinations of various fibers with cements or resinous materials, in such a way that normally rigid pipe is afforded a substantial degree of bending flexibility in long, coupled lengths, and yet is sufficiently strong to withstand any tendency to pull the coupled pipes apart since a pull on the coupling places the rubber gasket in shear to which it is known to offer its greatest resistance. In fact, tension only serves to increase the tightness of the seal which the coupling provides between the pipe ends. The simplicity of the coupling enables it to be connected and disconnected by unskilled labor, and its great strength enables considerable lengths of coupled pipe to be drawn over rough terrain without impairing the coupling, notwithstanding the bending and tension forces applied thereto.

For a more complete understanding of the invention, reference may be had to the accompanying drawings in which.

Figure 1:
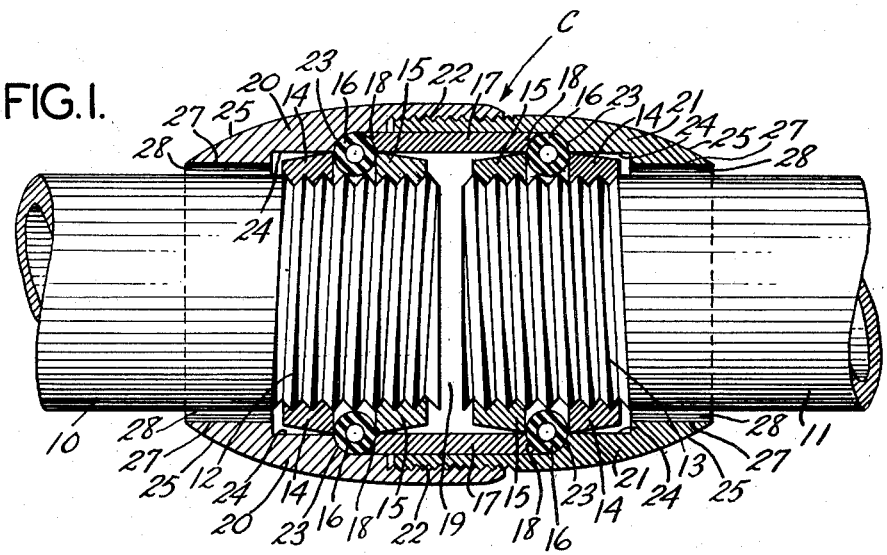
Figure 1 is an axial section through the coupling of this invention, as adapted to connect two threaded pipe ends together.

Referring to Fig. 1 of the drawings, numerals 10 and 11 designate two pipes whose aligned ends are provided with threads 12 and 13, respectively, the pipe being either of metal, or of a fiber and cement or binder combination capable of being threaded, or having threads otherwise formed therein, such as molded or cast asbestos-cement, glass-fiber-resin, and the like. Screwed on the respective threaded ends 12 and 13 are a pair of rings 14 and 15 of metal or nonmetallic material like a phenolic resin or the like, which are spaced apart so as to form a groove between them for the reception of a gasket 16 of resilient material, preferably rubber or equivalent rubbery material.

Preferably the gasket material is selected so as to be immune to deterioration by the fluid to be transported through the pipe-line. For example, if the fluid is oil or natural gas, the resilient material of which gasket 16 should be made is neoprene, or its equivalent, which is not affected by oil or natural gas. Similarly, if corrosive liquids like acids or abrasive fluent solids, are to be transported through the pipe, the gasket 16 will be selected accordingly, although, as will be pointed out, the contact between the transported fluid or fluent solid and the gaskets 16 is minimized and may be substantially eliminated.

The gasket 16 usually is solid in cross-section but may be made hollow or tubular, as shown, and filled with air or other gas under pressure, or with a suitable liquid or viscous material, which will flow or be squeezed from one portion of the gasket passage to the other when the section thereof is decreased at any point.

The groove-forming rings 14 and 15 preferably are so shaped as to taper away from the gasket 16 at each side, and their largest diameter adjacent the gasket 16 is approximately equal to the diameter of the axial center line of the cross-section of the gasket which, in the case of the circular gasket shown, is the diameter of the axis of the circular section. Although a circular gasket 16 is preferred, it may have a different shape, providing it performs the same function to be described.

Encircling the adjacent pipe ends 12 and 13 and spanning the space between them, is a tubular sleeve 17 whose opposite ends 18 are shaped to conform to the contour of the lateral sides of the corresponding gasket 16 which protrudes beyond the rings 14 and 15 and which that end 18 of sleeve 17 is adapted to abut. The axial length of the sleeve 17 is greater than the added lengths of the pipe ends inboard from the gasket 16, so as to afford a space 19 between the ends 12 and 13 of the adjoining pipes as shown in Fig. 1, the purpose of which will be described.

Preferably, the inner diameter of the sleeve 17 is slightly larger, e. g., on the order of a few thousandths of an inch, than the maximum diameter of the rings 15 which the sleeve 17 overlaps, so as to preclude as much as possible, the contact between the contents of the pipe and the gasket 16.

Encircling the ends 12 and 13 of the adjoining pipes, sleeve 17, rings 14 and 15, and gaskets 16 are collars 20 and 21 which are adapted to be screwed together by means of the pipe threads 22 in the socket of collar 20 and on the end of the collar 21.

Collars 20 and 21 each are provided with an internal shoulder 23 having the contour of the adjacent surface of the protruding portion of the corresponding gasket 16. Collars 20 and 21 also have an inner recess whose wall 24 has a diameter only a few thousandths of an inch greater than the maximum diameter of the ring 14 which it overlaps, and the opening 27 through which the pipes 10 and 11 project, is made substantially larger than the outer diameter of the corresponding pipes 10 and 11, so as to afford an annular space 28 for purposes to be described. When collars 20 and 21 are screwed together, shoulders 23 on collars 20 and 21 and the ends 18 of sleeve 17 embrace and squeeze between them the protruding half of the corresponding gasket 16. The outer surface 25 of the ends of the shoulders 20 and 21 are tapered, as shown, so as to afford as little obstruction as possible to objects over which the coupled pipe may be dragged or drawn.

In connecting the two ends of the pipes 10 and 11 with the complete coupling just described and designated C in Fig. 1, the collars 20 and 21 are first slipped over the ends of the pipes 10 and 11, rings 14 are screwed on the ends of the pipe, preferably to the ends of the threads 12 and 13, then gaskets 16 are slipped over the ends of the pipe against corresponding rings 14 and finally rings 15 are screwed onto the ends of the pipes until they closely engage the corresponding gaskets 16, but with insufficient pressure to deform them materially. The two ends 12 and 13 of the pipe are placed in alignment within sleeve 17 and moved together until the ends 18 of sleeve 17 engage the gaskets 16, thus leaving a space 19 between the ends of the pipe, since the axial length of sleeve 17 is greater than the ends of the pipe protruding inboard beyond the corresponding gaskets 16. Then the collars 20 and 21, previously placed on the corresponding pipes 10 and 11, respectively, are screwed together by means of the threads 22 until considerable pressure is applied to both sides of gaskets 16 by corresponding surfaces 18 and 23. This opposite pressure causes gaskets 16 to expand radially inwardly and outwardly to seal the joint between collars 20 and 21 and the corresponding ends 12 and 13 of the pipes 10 and 11, respectively.

It will be observed that the substantial coincidence between the maximum diameter of the rings 14 and 15 and the diameter of the center of the section of the gaskets 16 precludes the latter from being forced too far outwardly by and between the rings 14 and 15 if the rings are initially screwed too closely together in assembly, as well as when completing the coupling operation. Similarly, the substantial coincidence between the inner diameter of sleeve 17 and of recesses 24 on collars 20 and 21 and the center of the section of gaskets 16 likewise precludes the latter from being forced inwardly too far into the threads 12 and 13. Accordingly, this dimensional arrangement provides that the gaskets 16 are stabilized by being squeezed equally in opposite directions radially between the surfaces 18 and 23 as the collars 20 and 21 are drawn together, so that all couplings are sealed uniformly.

It will be seen by reason of the space 19 between the ends 12 and 13 of the pipes 10 and 11, the flexibility of the gaskets 16 and the spaces 28 between the outer surfaces of the pipe and the inner diameter 27 of the openings therefor, a degree of angular flexibility between the two pipes 10 and 11 is afforded. The angle of flexibility may be increased by making the gaskets 16 hollow in the manner described, this angular movement thus afforded being up to about thirty degrees relatively to the axis of the pipes.

It will be understood that the other limits are the radial dimension of the annular space 28 and width of the space 19 between the ends of the pipe, both of which should be sufficient to accommodate the flexibility of the gaskets 16, as is usually the case. Accordingly, the pipe may be bent at the couplings C within the limits described, which are usually adequate for cross-country pipe-line purposes, and the pipe may be dragged with the pull up to fifteen tons without impairment of the strength of the coupling or leakage thereof, since the rubber gasket 16 is confined and may not "flow" materially. This is particularly so when the gasket 16 is made solid so that tension on the coupled pipe across the coupling C serves to urge the gasket 16 against the shoulders 23 to more tightly seal the joint between the coupling and the corresponding pipe, and the rubber of gasket 16 is placed in shear across its widest section to utilize its greatest strength capacity, the gasket 16 being otherwise substantially completely enclosed and unable to "flow" materially.

Figure 2:
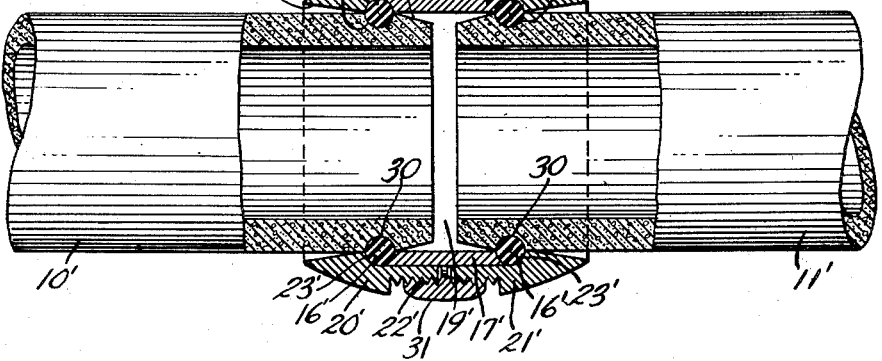
Fig. 2 is a similar section through pipe connected by the coupling of this invention, the pipe being provided with a groove for the reception of the rubber gasket instead of being threaded.

In the modification of the coupling illustrated by Fig. 2, the gasket 16' in inserted in a groove 30 of semi-circular cross-section formed in the surface of the pipe adjacent its end, as shown. This type of joint is particularly adaptable for concrete pipe and others not readily susceptible to threading or threads formed therein having insufficient strength. The sleeve 17' engages the inner surfaces of the gasket 16' so as to space the ends of the pipe 10' and 11' apart at 19', as shown, and the shoulders 23' on the inner surfaces of the sleeves 20' and 21' engage the outer surface of the outer gasket 16'. Although the gasket groove 30 thins and therefore weakens the pipe at that point, the gasket 16' and the pressure thereof compensates for this weakness and restores the strength of the pipe.

In order to provide the necessary bending clearance the adjacent ends of the pipes 10' and 11' are chamfered at 15' and the pipe openings in the ends of the collars 20' and 21' are flared as shown. Alternatively, the sleeve 17' may be made internally concave like a section of a sphere, instead of chamfering the pipe at 15'.

As an alternative way of coupling the collars 20' and 21' together, the adjoining ends thereof are provided with left and right-hand threads 22' and a nut 31 having mating left and right-hand threads employed to draw the collars together and seal the coupling in the manner described in connection with Fig. 1. It will be understood that the shoulders 23' and the ends of sleeve 17' fit the protruding surfaces of the gaskets 16' closely, so that they are substantially completely enclosed.

Figure 3:
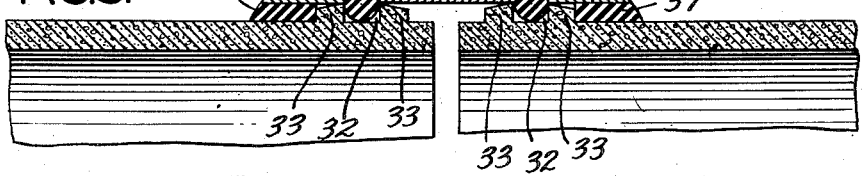
Fig. 3 is a similar section through the new pipe coupling as applied to a pipe having flanges at their ends affording the gasket groove.

In Fig. 3, the groove 32 for gasket 16'' is formed by circular ribs 33 cast or otherwise formed on the end of each pipe, but, by reason of the enlarged diameter of these ribs 33, the inside diameters of collars 34 and 35 must be made slightly larger so as to enable the collars to be emplaced on the pipes before the gaskets 16'' are inserted in the grooves 32. After the coupling is sealed as before, by drawing collars 34 and 35 together by means of nut 36 cooperating with the left and right-hand threads on the collars, it will be seen that a considerable space is left between the inside diameter of the collars and the corresponding pipe surface, which would accumulate dirt when the coupled pipe is dragged along the ground. Accordingly, this space is closed by a rubber washer-like insert 37, as shown. The inserts 37, being resilient, permit the aforementioned angular movement between the adjoining pipe which is afforded by the coupling. It will be understood that similar resilient inserts may be used in the other embodiments, but ordinarily they are not required.

Figure 4:
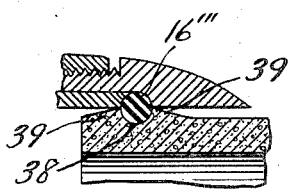
Fig. 4 is another modification of the coupling combining the features of Figs. 2 and 3 in that the gasket groove is formed jointly by a shallow slot in the pipe and by flanges thereon.

A way of minimizing the space closed by insert 37 in Fig. 3, so as to make the insert unnecessary in most cases, is shown in Fig. 4, which also is adaptable to use with unthreaded pipes like concrete pipes, for example. There the groove 38 for the gasket 16''' is formed jointly by a slot 38 in the normal surface of the pipe and by circular ribs 39, i. e., a compromise between the arrangements of Figs. 2 and 3, so that the ribs protrude above the normal surface of the pipe by one-fourth the diameter of the gasket 16''' instead of by one-half its diameter as in Fig. 2. This leaves a substantial thickness of pipe wall at the groove 38 and also leaves a relatively narrow annular slot between the collar and the pipe surface, allowing the bending at the coupling without requiring an insert like 37 in Fig. 3.

It will be understood that, although several embodiments of the invention have been illustrated and described herein, the invention is not limited thereby, but is susceptible of changes in form and detail within the scope of the appended claims.

I claim:

1. A coupling for connecting pipes in end-to-end relation comprising a pair of spaced apart circumferential abutments forming a groove therebetween adjacent the end of each pipe to be coupled, a resilient gasket of substantially circular cross-section encircling each pipe end and bedded in said groove and protruding radially therefrom, the largest diameter of the abutments being approximately equal to the diameter of the axial center line of the cross-section of the gasket, a collar member encircling and of greater internal diameter than the adjacent ends of said pipes and said abutments and having inwardly extending shoulders adjacent to its ends engaging the outer lateral sides of the protruding portions of said gaskets, said collar outwardly of said gaskets being spaced radially from said pipes and abutments, and a sleeve within said collar member and spanning the ends of said pipes and the inner abutments between said gaskets, said sleeve having its opposite ends engaging the inner lateral sides of the protruding portions of said gaskets, the sleeve also being spaced radially from the ends of the pipes substantial distances, the lengths of said collar member and sleeve being such as to hold said pipes in end-to-end relation and each gasket clamped against said abutment and between the ends of the sleeve and the corresponding shoulder on the collar member, the radial spacing between the collar, sleeve, pipes and abutments thereon being sufficient to enable substantial relative angular movement of said pipes and the coupling.

2. The coupling set forth in claim 1, in which the ends of said collar have inner flared surfaces opposed to said pipes and said adjacent ends of said pipes are chamfered to provide clearance for said relative angular movement of said pipes and the coupling.

3. The coupling set forth in claim 1, in which the abutments comprise circumferential flanges having tapered outer edges of greatest diameter adjacent to the groove therebetween to provide clearance for said relative angular movement of said pipes and said coupling.

4. The coupling set forth in claim 1, comprising resilient annular inserts interposed between said collar and said pipes outwardly of said gaskets.

BERNARDINO F. GALLUPPI.

References Cited in the file of this patent

UNITED STATES PATENTS

| Number | Name | Date |
|---|---|---|
| 18,116 | Wright | Sept. 1, 1857 |
| 607,180 | Landis | July 12, 1898 |
| 817,300 | David | Apr. 10, 1906 |
| 1,324,046 | Hatfield | Dec. 9, 1919 |
| 1,622,768 | Cook et al. | Mar. 29, 1927 |
| 2,355,871 | Kraft | Aug. 15, 1944 |
| 2,453,391 | Whittingham | Nov. 9, 1948 |
| 2,460,032 | Risley | Jan. 25, 1949 |

FOREIGN PATENTS

| Number | Country | Date |
|---|---|---|
| 349,711 | Great Britain | June 4, 1931 |
| 377,349 | Great Britain | July 28, 1932 |
| 150,205 | Austria | Mar. 15, 1937 |
| 556,010 | Great Britain | Sept. 16, 1943 |